Figure 1:
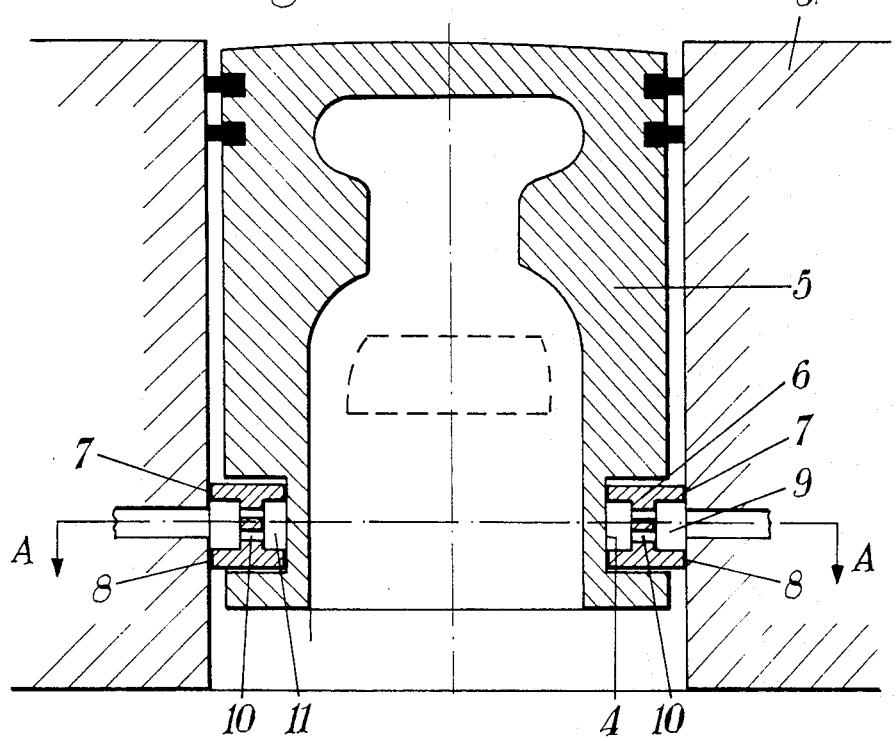

United States Patent [19]

Biagini

[11] Patent Number: 4,672,931

[45] Date of Patent: Jun. 16, 1987

[54] LUBRICATION SYSTEM WITH OIL RECOVERY FOR A TWO-STROKE ENGINE PISTON WITH PUMP-SUMP FOR SCAVENGING

[75] Inventor: Livio Biagini, Bologna, Italy

[73] Assignee: B-Art S.a.s., Bologna, Italy

[21] Appl. No.: 870,096

[22] Filed: Jun. 2, 1986

[30] Foreign Application Priority Data

Jun. 4, 1985 [IT]   Italy ................................ 48165 A/85

[51] Int. Cl.$^4$ ............................................. F02F 75/06
[52] U.S. Cl. .............................. 123/193 P; 123/196 R; 123/59 BS; 123/65 S
[58] Field of Search ........... 123/193 P, 196 R, 193 C, 123/65 S, 59 BS

[56] References Cited

U.S. PATENT DOCUMENTS

| | | | |
|---|---|---|---|
| 4,242,948 | 1/1981 | Stang et al. | 123/193 P |
| 4,245,611 | 1/1981 | Mitchell et al. | 123/193 P |
| 4,331,065 | 5/1982 | Fellberg | 123/193 P |
| 4,432,313 | 2/1984 | Matlock | 123/193 P |
| 4,522,163 | 6/1985 | Hooper | 123/193 P |

FOREIGN PATENT DOCUMENTS 9887142  1/1983  U.S.S.R. ........................ 123/193 P

*Primary Examiner*—E. Rollins Cross
*Attorney, Agent, or Firm*—Bruce L. Adams; Robert E. Burns; Emmanuel J. Lobato

[57] ABSTRACT

A lubrication system with oil recovery for a two-stroke engine piston with pump-sump for scavenging, said system consisting of a lubicating oil pressure circulation system having inlet and outlet holes for the oil, said holes passing through the wall of the cylinder, and of shaped scraper rings, each ring being housed within a circular housing or seat obtained on the outside skirt of the piston, said circular housings being provided on the skirt of the piston at a height which does not allow any overlapping of said scraper rings on the transfer ports of the two-stroke engine.

6 Claims, 2 Drawing Figures

LUBRICATION SYSTEM WITH OIL RECOVERY FOR A TWO-STROKE ENGINE PISTON WITH PUMP-SUMP FOR SCAVENGING

DISCLOSURE OF THE INVENTION

The present invention relates to a lubrication system with oil recovery for a two-stroke engine piston with pump-sump for scavenging.

More particularly, this invention relates to a lubrification system of the type mentioned above which allows the piston of a two-stroke engine to be lubricated with lubricating oil in large amounts and with minimum oil losses, which losses are comparable with the losses occurring in the lubrication of four-stroke engines.

It is well known that the lubrication of four-stroke engines can be obtained through splashing, or that it can be of the oil pressure type through the employment of pumps and of lubricating jet nozzles.

Both such lubrication systems of the piston are carried into effect through the employment of scraper piston rings housed in one or more housing or seats obtained on the piston, said scraper piston rings being made up of one or more steel or cast iron rings scraping the inside chamber of the cylinder. Moreover, said rings are provided with notches contained between the scraping angles of the scraper ring on the cylinder so as to make the scraped surface of the cylinder to communicate with the inside part of the oil sump through holes which are opportunely obtained in the piston skirt.

Moreover, it is well known that such lubrification type, which would be decidedly advantageous, cannot be applied in the case of two-stroke engines having a scavenging system with pump-sump, as, because of the particular conformation of the scavenging slits, a transfer would occur of the lubricating oil from the pump-sump delimited by the crank gear chamber and by the lower part of the piston, towards the upper part of the cylinder. Thus, the atmosphere containing oil in the vapor state or in the state of a droplets suspension, would be projected into the cylinder with drawbacks in the normal operation of the engine.

At the present time the lubrication system type for two-stroke engines which is most similar to the lubrication system employed for four-stroke engines can be realized by providing a particular scavenging system which is obtained by means of an outside blower, so that the crank gear chamber is never in communication with the cylinder volume in which the thermodynamic process occurs.

The lubrication system for two-stroke engines with pump-sump for scavenging is realized at the present time through:

(a) the mixing of a suitable amount of the lubricating oil in the gasoline;

(b) the pumping of a predetermined amount of the lubricating oil through a gear pump, said amount being predetermined as a function of the rounds per minute of the engine as well as of the opening of the acceleration control unit;

(c) the dropping of an oil amount as a function of the rounds per minute onto choke tube or diffuser interposed in the induction duct, which system is particularly employed in two-stroke engines having a pump-sump system and employing a gaseous fuel.

All three solutions mentioned above have in common the drawback that the recovery of the lubricating oil is impossible. Moreover, as the percentage of the oil employed is forcedly limited, the seizure of the cylinder piston occurs if the cooling efficiency is lowered or if overheating occurs, or in the case of heavy-duty conditions.

As a result of the above considerations, it is evident that an advantage can be obtained from a lubrication system for two-stroke engines with pump-sump for scavenging which is free from the drawbacks of the lubrication systems employed at the present time and which, in addition, is of the type with the recovery of the lubricating oil surpassing the impediments which have prevented its realization up to the present time, said system showing the performance of the lubrication systems employed with four-stroke engines.

The present invention attempts at satisfying such needs by supplying a fundamental technical teaching for the realization of a lubrication system with oil recovery for two-stroke engine pistons with pump-sump for scavenging, said system substantially consisting of an oil pressure circulation system connected with inlet and outlet holes for the oil which are obtained on the cylinder, and of a scraper ring which is suitably shaped and arranged within a groove obtained on the outside skirt of the piston, said groove not communicating with the inside of the same, and being placed at a height such as to avoid absolutely any interference, during the piston stroke, of the scraper ring with the commonly employed transfer ports which are generally present in two-stroke engines.

Accordingly, it is a specific object of the present invention a lubrication system with oil recovery for a two-stroke engine piston with pump-sump for scavenging, said system consisting of a lubricating oil forced circulation system having inlet and outlet holes for the oil obtained through the wall of the cylinder, and of shaped scraper rings each ring being housed within a circular housing or seat obtained on the outside skirt of the piston which does not communicate with the inside of the same, said circular seats being provided on said skirt of the piston at a height which does not allow any overlapping of said scraper rings on the transfer ports of the two-stroke engine.

According to a preferred embodiment of the lubrication system of the present invention, said scraper rings are shaped so as to obtain two chambers in the shape of a circular crown between their central part and, respectively, the cylinder and said circular seats, two such chambers being made to communicate through holes obtained on said central part, security dowels being provided in order to fasten said scraper rings.

In particular, said scraper rings are in the shape of a double T, so as to show two rims which scrape the inside wall of the cylinder and are provided with holes on their central vertical part.

Preferably, just one only scraper ring is provided with its circular seat for housing the same and, consequently, one only inlet hole and one only outlet hole.

In particular, said outlet hole can be opportunely shaped so as to make it possible to regulate the amount of oil which is to be kept desirably within said two chambers of the scraper ring.

When the lubricating oil is made to circulate, the same will enter through the inlet hole and will occupy the two chambers realized by the scraper ring and the cylinder and by the scraper ring and the groove, said oil going then out from the outlet hole.

The oil going in and out occurs each time the scraper ring is at a point corresponding to the inlet and outlet holes, i.e., once at each revolution of the driving shaft.

It is well evident from the technical teachings supplied by the present invention that they allow to obtain a continuous and almost complete recovery of the oil employed for the lubrication of the piston, and to avoid in addition any contact between the scavenging gas present in the crank gear chamber of the engine and the lubricating oil. Thus the amount of oil employed is a function of the pressure at which said circulation system works, as well as of the number of the scraper rings present and of the number of holes.

Figure 2:
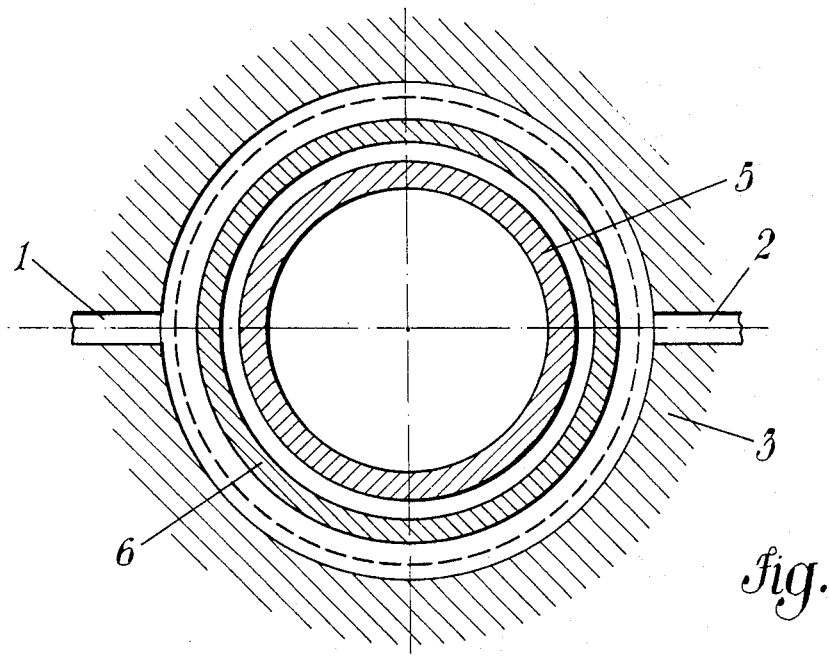

This invention will be disclosed in the following with particular reference to some preferred embodiments of the same which are illustrated in the Figures of the enclosed drawings, wherein:

FIG. 1 is a schematic view of a cylinder and piston with the lubrication system according to the present invention; and FIG. 2 is a cross section of FIG. 1 taken along the line A—A.

With reference now to both the Figures mentioned above, numbers 1 and 2 clearly show the inlet and outlet holes of the oil under pressure, provided through the walls of the cylinder 3. The lubricating oil is made to circulate by means of a common lubrication pump (not shown).

Number 4 points out a groove which is suitably sized and is obtained on the skirt of the piston 5. It is important to observe that said groove 4 has no hole communicating with the inside of the piston 5.

The scraper ring 6 is housed within said groove 4, said ring, as shown clearly, being opportunely shaped and having well determined features.

Indeed, it has two pressure rims 7 and 8 which properly work as oil scraping members and convey the excess oil to the volume 9 defined by the cylinder 3, by the two rims 7 and 8 and by the stub-groove of the scraper ring 6.

Said scraper ring 6 is kept in its position by means of a dowel (not shown) so that it cannot rotate with respect to the piston.

The holes 10 are obtained on said stub-groove of the scraper ring 6, said holes making the volume 9 to communicate with the volume defined by the groove 4 and by the scraper ring 6, which is pointed out with number 11. In the realization stage, said holes 10 will be arranged so as not to correspond with the transfer and exhaust ports.

The lubricating oil is introduced through the hole 1 by the action of the lubrication pump and it goes into the volume 9 and the volume 11, and then it flows out freely through the outlet hole 2.

It is clearly evident that the introduction and the flowing out of the lubricating oil only occur when the scraper ring 6 is at the point corresponding to the two holes 1 and 2, i.e., once at each complete revolution of the driving shaft.

By suitably shaping the outlet hole 2, a better lubrication can be easily supplied because the action is performed on the amount of the lubricating oil present between the scraper ring 6 and the underlying gap.

Employing such lubrication type, the lubricated part corresponds to the part run by the scraper ring 6, i.e., to the length of the stroke of the piston 5.

In order to prevent the scraper ring 6 from running over the transfer ports, so giving rise to a loss of lubricating oil, said scraper ring 6 is arranged on the lower rim of the piston 5 so as to avoid the overlapping of the ring with the slits which are typically present in two-stroke engines. As the slack between the piston 5 and the cylinder 3 is kept at a minimum when constructing the same, an optimal lubrication effect is obtained with minimum losses.

Indeed, when the scraper ring runs over the inside part of the cylinder 3, an oil film is formed which, owing to the reciprocating motion of the piston 5, comes in contact with the whole skirt of the piston so that an optimal lubrication will be attained at any revolution.

It is clearly evident that the shape of the groove 4 as well as the shape of the scraper ring 6, and consequently the number of the scraper rings 6 and of their scraping rims 7 and 8 can be different from the shapes illustrated in the Figures of the drawings without changing in any way the principle on which the lubrication system of the present invention is based.

The number and the sizes of the inlet holes 1 and the outlet holes 2, as well as of the holes 10 can also be changed at any actual occasion according to the engine construction needs.

The present invention has been disclosed for illustrative and not for limitative purposes according to some preferred embodiments of the same, but it is to be understood that modifications and changes can be introduced into the same by those who are skilled in the art without departing from the spirit and the scope of the invention for which a priority right is claimed.

I claim:

1. A lubrication system with oil recovery for a two-stroke engine piston with pump-sump for scavenging, said lubrication system consisting of a lubricating oil forced circulation system having inlet and outlet holes for the lubricating oil which are obtained through the wall of the cylinder, and also consisting of shaped scraper rings housed each within a circular seat obtained on the piston skirt which do not communicate with the inside of the same, said circular seats being provided on the piston skirt at such a height as not to allow any overlapping of said scraper rings with the transfer ports of the two-stroke engine.

2. A lubrication system according to claim 1 characterized in that said scraper rings are so shaped as to obtain two chambers in the shape of a circular crown between their central part and, respectively, the cylinder and said circular seats, said two chambers being in communication with each other through central holes provided on said central part, a number of dowels being provided for keeping said scraper rings fixed.

3. A lubrication system according to claim 2, characterized in that said scraper rings are in the shape of a double T and they are provided with holes on their vertical central part.

4. A lubrication system according to claim 2, characterized in that one only scraper ring is provided with its circular seat for housing the same and with the corresponding inlet and outlet holes.

5. A lubrication system according to claim 1, characterized in that said outlet hole is shaped so as to allow the amount of lubricating oil present within the scraper ring to be regulated.

6. A lubrication system according to claim 1, characterized in that one only scraper ring is provided with its circular seat for housing the same and with the corresponding inlet and outlet holes.

* * * * *